(12) United States Patent
Bagai

(10) Patent No.: US 9,284,050 B2
(45) Date of Patent: Mar. 15, 2016

(54) AIRFOIL FOR ROTOR BLADE WITH REDUCED PITCHING MOMENT

(75) Inventor: Ashish Bagai, Trumbull, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 1131 days.

(21) Appl. No.: 13/315,767

(22) Filed: Dec. 9, 2011

(65) Prior Publication Data

US 2013/0149160 A1 Jun. 13, 2013

(51) Int. Cl.
*B64C 27/467* (2006.01)
*B64C 27/46* (2006.01)
*B64C 3/14* (2006.01)

(52) U.S. Cl.
CPC ............. *B64C 27/463* (2013.01); *B64C 27/467* (2013.01); *B64C 2003/147* (2013.01); *Y02T 50/12* (2013.01)

(58) Field of Classification Search
CPC ............... F01D 5/141; F05D 2240/301; F05D 2240/304; F05D 2240/307; F05D 2250/74; B64C 27/483; B64C 27/467; B64C 2003/147
USPC .................. 416/242, 241 R, DIG. 2
See application file for complete search history.

(56) References Cited

U.S. PATENT DOCUMENTS

| 2,669,313 | A | * | 2/1954 | Lightfoot | 416/1 |
| 4,412,664 | A | * | 11/1983 | Noonan | 244/35 R |
| 4,416,434 | A | * | 11/1983 | Thibert et al. | 244/35 R |
| 4,459,083 | A | | 7/1984 | Bingham | |
| 4,569,633 | A | * | 2/1986 | Flemming, Jr. | 416/228 |
| 5,344,102 | A | | 9/1994 | Nakadate et al. | |
| 5,961,290 | A | * | 10/1999 | Aoki et al. | 416/223 R |
| 6,164,918 | A | * | 12/2000 | Aoki et al. | 416/223 R |
| 6,315,522 | B1 | * | 11/2001 | Yamakawa et al. | 416/223 R |
| 6,361,279 | B1 | | 3/2002 | Rodde et al. | |
| 7,854,593 | B2 | * | 12/2010 | Owen | 416/223 R |

* cited by examiner

*Primary Examiner* — Richard Edgar
*Assistant Examiner* — Juan G Flores
(74) *Attorney, Agent, or Firm* — Cantor Colburn LLP

(57) ABSTRACT

A rotor blade for a rotary wing aircraft includes a root region extending from a rotor head to about 15% to 20% of a blade radius, a main region extending from a radial extent of the root region to about 80% to 95% of the blade radius, and a tip region extending from a radial extent of the main region to a blade tip. At least a portion of one of the root region, the main region and the tip region includes an airfoil profile section defined by a scaled set of coordinates in which a set of y/c coordinates listed in Table I are scaled by a selected factor.

10 Claims, 3 Drawing Sheets

AIRFOIL FOR ROTOR BLADE WITH REDUCED PITCHING MOMENT

BACKGROUND

The subject matter disclosed herein relates to rotary-winged aircraft. More specifically, the subject disclosure relates to an airfoil section for at least partial use on a rotor blade of a helicopter.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed producing high lift, but increasingly higher drag that results in higher rotor power requirements. Forward movement of the aircraft thereby generates a dissymmetry of lift between the advancing and retreating sides of the rotor. This dissymmetry may create an unstable condition if lift is not equalized across the advancing and retreating sides of the rotor. An important approach in alleviating this dissymmetry is to use airfoils that are capable of producing high lift at high pitch angles and low relative velocities over the retreating side, while minimizing the increase in drag over the advancing side. However, designing such airfoils results in conflicting requirements as governed by the physics of the problem. That is, designing an airfoil that is capable of producing high lift at low speeds and low drag at high speeds typically results in the manifestation of some other undesirable characteristics, such as pitching moments that exceed the structural-dynamic tolerance of the rotor blades and control hardware.

Many airfoil sections have been developed, for example, as in US Patent Appl. Pub. 2007/0187549, that when applied to a main rotor of a helicopter, alleviate the unstable condition by addressing the lift and drag effects on the blade. These blades, however, exhibit high pitching moments which are detrimental to rotor blade dynamic characteristics.

SUMMARY

An embodiment of a rotor blade for a rotary wing aircraft typically includes three regions: 1) a root region that extends to about 15%-20% of the blade radius, and includes means by which the blade is attached to the rotor head, 2) a main region that extends outboard of the root region to about 80%-95% of the blade radius, and 3) an outer, tip region that extends over the outermost region (20%-5% radius) of the rotor blade. The main and the tip regions of rotor blades would benefit most significantly by the inclusion of an airfoil profile section defined by a set of y/c coordinates listed in Table I are appropriately scaled to a required dimension by a selected sizing factor.

An embodiment of a helicopter having a rotor system includes a plurality of rotor blades, each rotor blade including three regions: 1) a root region that extends to about 15%-20% of the blade radius, and includes means by which the blade is attached to the rotor head, 2) a main region that extends outboard of the root region to about 80%-95% of the blade radius, and 3) an outer, tip region that extends over the outermost region (20%-5% radius) of the rotor blade. The main and the tip regions of rotor blades would benefit most significantly by the inclusion of an airfoil profile section defined by a set of y/c coordinates listed in Table I are scaled by a selected sizing factor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed descriptions taken in conjunction with the accompanying drawings in which:

The detailed description explains embodiments of the invention, together with advantages and features, by way of example with reference to the drawings.

DETAILED DESCRIPTION

Figure 1:
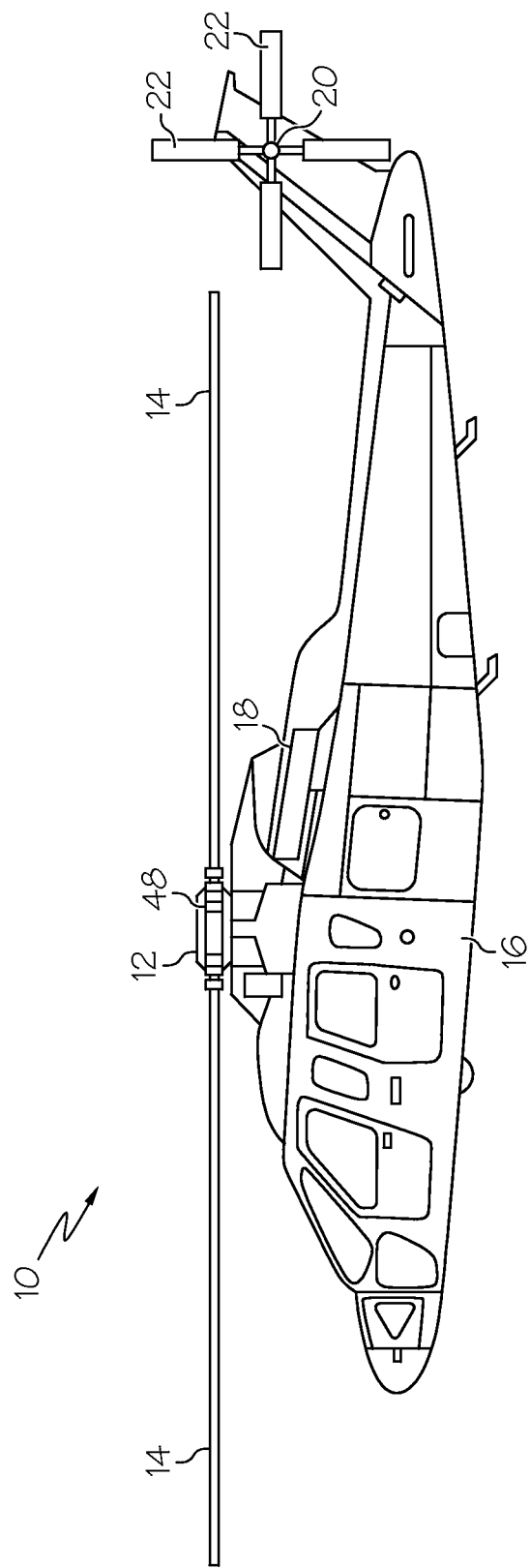
FIG. 1 is a schematic view of an embodiment of a rotary wing aircraft.

Shown in FIG. 1 is a rotary wing aircraft 10 having a main rotor 12 with a plurality of main rotor blades 14. An airframe 16 supports the main rotor 12 and a propulsion system 18 which drives the main rotor 12. The aircraft 10 may also include a tail rotor 20 having a plurality of tail rotor blades 22.

Figure 2:
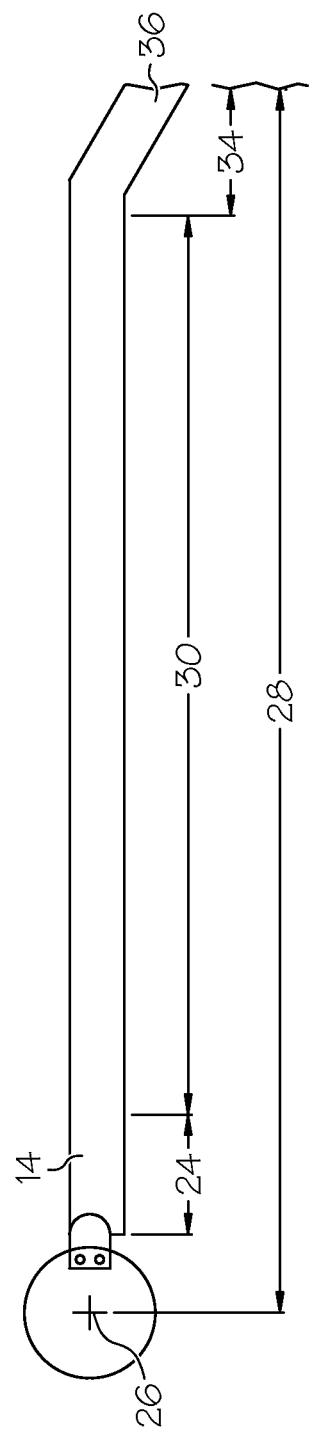
FIG. 2 is a schematic view of an embodiment of a rotor blade of a rotary wing aircraft illustrating root, main and tip areas of the rotor blade.

FIG. 2 illustrates a general exemplary plan view of a main rotor blade 14. The main rotor blade 14 includes a root region 24 which extends from a hub 26 over about a first 15% to 20% of a main rotor radius 28 and includes means by which the rotor blade 14 is secured to a rotor head 48. A main region 30 extends from the root region 24 to about 80% to 95% of the radius 28. The blade further includes a tip section 34 that extends outboard of the main section from about 80% to 85% of the radius 28 to the blade tip 36.

The rotor blade 14 has a cross-sectional airfoil shape of the present invention over at least part of the radius 28 which alleviates the pitching moment of prior art blades while maintaining the positive aerodynamic characteristics of the blade 14. This is accomplished by providing a reflex camber over about the aft 20% chord of the blade 14, "aft" referring to a portion of the blade 14 closest to a trailing edge 38 of the blade 14. Reflex camber is imparted on the blade by deflecting the trailing edge 38 upward, in some embodiments by about 6% of chord over the prior art blade. The addition of the reflex camber to the prior art airfoil shape allows such an airfoil shape to be utilized over a larger radius 28 of the blade 14 thereby further maintaining the good lift and low drag aerodynamic characteristics of the airfoil shape but with reduced pitching moment.

Adding reflex camber effectively reduces the net overpressure on the lower surface near the trailing edge thereby reducing the exceedingly large negative (nose-down) pitching moment of the blade 14 that was produced by the original (prior art) airfoil. Reducing the magnitude of the negative pitching moment is a desireable effect and enables the use of the airfoil for rotor-blade applications.

Figure 3:
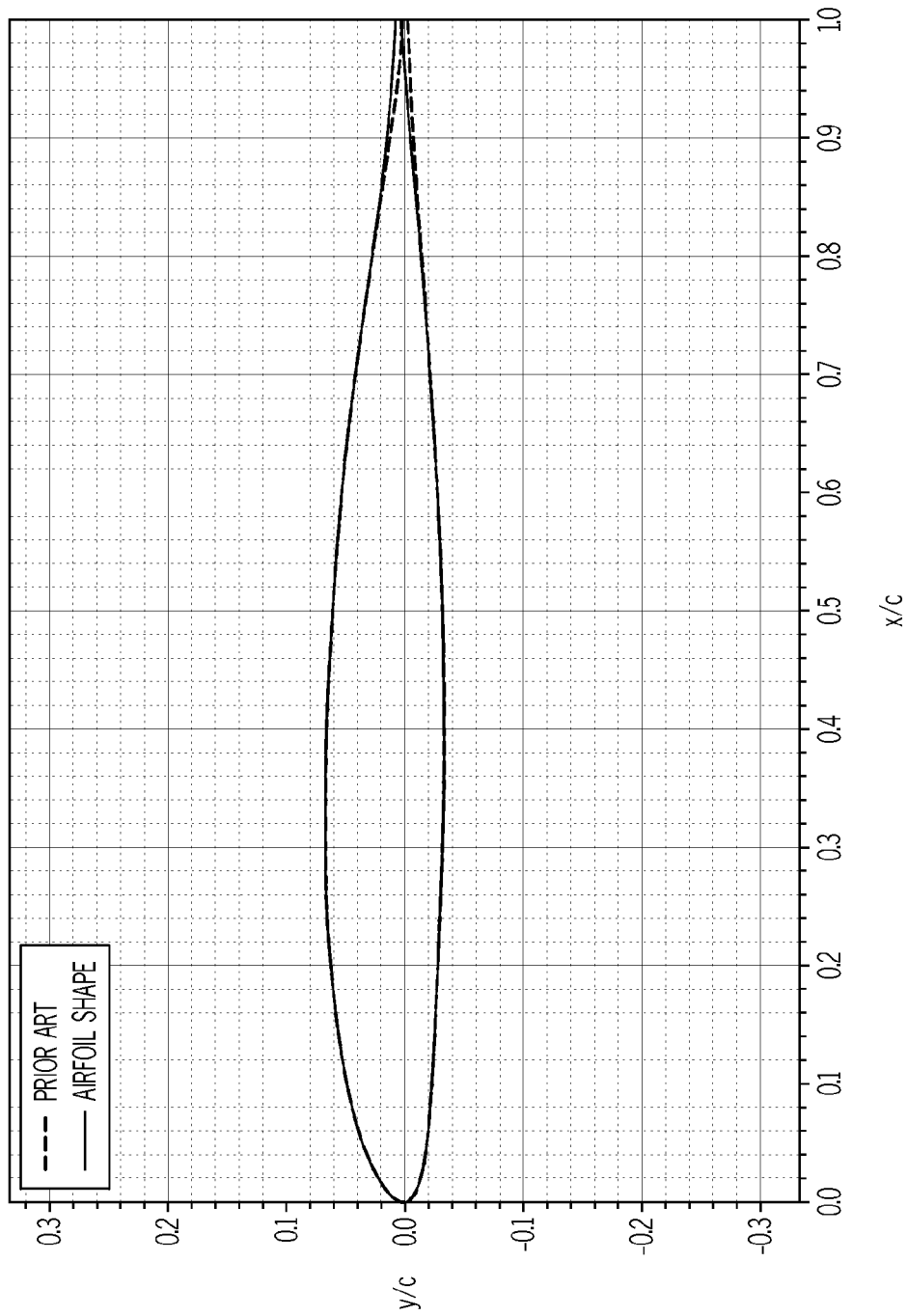
FIG. 3 is a cross-sectional view of an airfoil shape of a rotor blade compared to a prior art airfoil shape.

The airfoil cross-sectional shape is shown in FIG. 3 as ratios of x and y coordinates to chord length, "C". The values are then simultaneously scalable to any dimensional chord length. Because of the difficulty involved on providing an adequate written description of the particular airfoil section being described, the coordinates of a particular embodiment of the current invention reflex airfoil are set forth in Table I below with, as indicated, a first set of coordinates corresponding to an upper surface of the airfoil, as referenced by its attitude during normal upright flight of the helicopter, and a second set of coordinates corresponding to a lower surface of the airfoil.

TABLE I

| X/C | Y/C |
| --- | --- |
| Airfoil Pressure Surface: | |
| 1.000000 | 0.008466 |
| 0.995427 | 0.008495 |
| 0.989669 | 0.008577 |
| 0.982521 | 0.008760 |
| 0.973944 | 0.009084 |
| 0.964241 | 0.009560 |
| 0.953842 | 0.010191 |
| 0.943083 | 0.010961 |
| 0.932157 | 0.011851 |
| 0.921155 | 0.012850 |
| 0.910114 | 0.013947 |
| 0.899053 | 0.015124 |
| 0.887980 | 0.016378 |
| 0.876896 | 0.017700 |
| 0.865806 | 0.019079 |
| 0.854709 | 0.020515 |
| 0.843605 | 0.021997 |
| 0.832496 | 0.023521 |
| 0.821380 | 0.025082 |
| 0.810260 | 0.026673 |
| 0.799144 | 0.028288 |
| 0.788035 | 0.029919 |
| 0.776933 | 0.031560 |
| 0.765840 | 0.033201 |
| 0.754752 | 0.034833 |
| 0.743671 | 0.036445 |
| 0.732590 | 0.038031 |
| 0.721512 | 0.039586 |
| 0.710432 | 0.041099 |
| 0.699348 | 0.042573 |
| 0.688261 | 0.044001 |
| 0.677170 | 0.045382 |
| 0.666074 | 0.046713 |
| 0.654975 | 0.047994 |
| 0.643871 | 0.049224 |
| 0.632762 | 0.050408 |
| 0.621651 | 0.051547 |
| 0.610536 | 0.052641 |
| 0.599416 | 0.053693 |
| 0.588295 | 0.054706 |
| 0.577170 | 0.055679 |
| 0.566044 | 0.056616 |
| 0.554916 | 0.057515 |
| 0.543786 | 0.058378 |
| 0.532655 | 0.059206 |
| 0.521522 | 0.059996 |
| 0.510389 | 0.060750 |
| 0.499254 | 0.061466 |
| 0.488117 | 0.062145 |
| 0.476979 | 0.062786 |
| 0.465841 | 0.063388 |
| 0.454702 | 0.063952 |
| 0.443564 | 0.064477 |
| 0.432425 | 0.064961 |
| 0.421287 | 0.065405 |
| 0.410151 | 0.065808 |
| 0.399016 | 0.066166 |
| 0.387884 | 0.066478 |
| 0.376753 | 0.066743 |
| 0.365626 | 0.066958 |
| 0.354501 | 0.067121 |
| 0.343379 | 0.067232 |
| 0.332261 | 0.067285 |
| 0.321146 | 0.067281 |
| 0.310036 | 0.067213 |
| 0.298930 | 0.067082 |
| 0.287829 | 0.066883 |
| 0.276733 | 0.066616 |
| 0.265642 | 0.066275 |
| 0.254557 | 0.065861 |
| 0.243481 | 0.065366 |
| 0.232411 | 0.064788 |
| 0.221351 | 0.064124 |
| 0.210302 | 0.063371 |
| 0.199265 | 0.062521 |
| 0.188242 | 0.061570 |
| 0.177236 | 0.060512 |
| 0.166251 | 0.059339 |
| 0.155291 | 0.058040 |
| 0.144360 | 0.056604 |
| 0.133461 | 0.055016 |
| 0.122600 | 0.053266 |
| 0.111782 | 0.051336 |
| 0.101016 | 0.049212 |
| 0.090317 | 0.046880 |
| 0.079712 | 0.044325 |
| 0.069246 | 0.041530 |
| 0.059004 | 0.038487 |
| 0.049136 | 0.035199 |
| 0.039876 | 0.031711 |
| 0.031535 | 0.028127 |
| 0.024381 | 0.024597 |
| 0.018505 | 0.021251 |
| 0.013799 | 0.018154 |
| 0.010060 | 0.015297 |
| 0.007087 | 0.012635 |
| 0.004724 | 0.010107 |
| 0.002865 | 0.007662 |
| 0.001449 | 0.005256 |
| 0.000468 | 0.002850 |
| Airfoil Suction Surface: | |
| 0.000000 | 0.000000 |
| 0.000262 | −0.001992 |
| 0.001347 | −0.004210 |
| 0.003051 | −0.006022 |
| 0.005216 | −0.007567 |
| 0.007843 | −0.008982 |
| 0.011028 | −0.010350 |
| 0.014933 | −0.011716 |
| 0.019783 | −0.013104 |
| 0.025830 | −0.014529 |
| 0.033254 | −0.015977 |
| 0.042004 | −0.017398 |
| 0.051774 | −0.018736 |
| 0.062178 | −0.019950 |
| 0.072925 | −0.021036 |
| 0.083851 | −0.022002 |
| 0.094871 | −0.022869 |
| 0.105945 | −0.023649 |
| 0.117055 | −0.024362 |
| 0.128187 | −0.025022 |
| 0.139335 | −0.025639 |
| 0.150495 | −0.026220 |
| 0.161666 | −0.026771 |
| 0.172843 | −0.027305 |
| 0.184022 | −0.027819 |
| 0.195203 | −0.028316 |
| 0.206382 | −0.028797 |
| 0.217560 | −0.029261 |
| 0.228734 | −0.029705 |
| 0.239907 | −0.030125 |
| 0.251077 | −0.030524 |
| 0.262243 | −0.030898 |
| 0.273408 | −0.031244 |
| 0.284572 | −0.031563 |
| 0.295735 | −0.031851 |
| 0.306897 | −0.032111 |
| 0.318058 | −0.032340 |
| 0.329219 | −0.032540 |
| 0.340378 | −0.032709 |
| 0.351538 | −0.032844 |
| 0.362698 | −0.032951 |
| 0.373858 | −0.033026 |
| 0.385017 | −0.033071 |

TABLE I-continued

| X/C | Y/C |
|---|---|
| 0.396176 | −0.033086 |
| 0.407334 | −0.033067 |
| 0.418493 | −0.033018 |
| 0.429652 | −0.032938 |
| 0.440809 | −0.032829 |
| 0.451967 | −0.032687 |
| 0.463125 | −0.032515 |
| 0.474281 | −0.032311 |
| 0.485436 | −0.032075 |
| 0.496592 | −0.031805 |
| 0.507747 | −0.031502 |
| 0.518901 | −0.031166 |
| 0.530056 | −0.030797 |
| 0.541211 | −0.030394 |
| 0.552367 | −0.029958 |
| 0.563524 | −0.029493 |
| 0.574681 | −0.028995 |
| 0.585840 | −0.028468 |
| 0.596999 | −0.027918 |
| 0.608158 | −0.027339 |
| 0.619319 | −0.026740 |
| 0.630479 | −0.026119 |
| 0.641640 | −0.025477 |
| 0.652802 | −0.024815 |
| 0.663965 | −0.024137 |
| 0.675128 | −0.023444 |
| 0.686293 | −0.022735 |
| 0.697458 | −0.022005 |
| 0.708626 | −0.021257 |
| 0.719794 | −0.020485 |
| 0.730964 | −0.019686 |
| 0.742136 | −0.018862 |
| 0.753311 | −0.018010 |
| 0.764486 | −0.017130 |
| 0.775664 | −0.016218 |
| 0.786843 | −0.015274 |
| 0.798023 | −0.014298 |
| 0.809204 | −0.013293 |
| 0.820386 | −0.012260 |
| 0.831565 | −0.011203 |
| 0.842744 | −0.010126 |
| 0.853920 | −0.009030 |
| 0.865090 | −0.007915 |
| 0.876257 | −0.006789 |
| 0.887416 | −0.005654 |
| 0.898563 | −0.004516 |
| 0.909695 | −0.003387 |
| 0.920805 | −0.002274 |
| 0.931874 | −0.001189 |
| 0.942861 | −0.000144 |
| 0.953675 | 0.000838 |
| 0.964125 | 0.001734 |
| 0.973869 | 0.002511 |
| 0.982479 | 0.003138 |
| 0.989650 | 0.003606 |
| 0.995422 | 0.003942 |
| 1.000000 | 0.004188 |

To reduce the pitching moment, in some embodiments, the airfoil shape of Table I is applied at the tip section 34, for example, at an outer 5% to 7% of the blade span 28. It is to be appreciated that the airfoil section of Table I may be applied to other locations along the radius 28, or even the entire radius 28. Further, while in the embodiments described above the airfoil shape is applied to a main rotor blade 14 of a rotary wing aircraft 10, in other embodiments, the airfoil shape described herein may be utilized in, for example, the tail rotor 20 or in other applications such as prop-rotor, propeller blades, turbomachine blades, or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade for a rotary wing aircraft comprising:
   a root region extending from a rotor head to about 15% to 20% of a blade radius;
   a main region extending from a radial extent of the root region to about 80% to 95% of the blade radius; and
   a tip region extending from a radial extent of the main region to a blade tip, at least a portion of one of the root region, the main region and the tip region including an airfoil profile section defined by a scaled set of coordinates in which a set of x/c coordinates defined as a ratio of an x coordinate to a blade chord length, and y/c coordinates defined as a ratio of a y coordinate to the blade chord length, listed in Table I are scaled by a selected factor.

2. The rotor blade of claim 1, wherein the tip section is defined by an outboard 20% of the rotor blade span.

3. The rotor blade of claim 2, wherein the airfoil profile section is disposed at least partially at an outermost 5% to 7% of the rotor blade span.

4. The rotor blade of claim 1, wherein the airfoil profile section is at least partially disposed at the root region.

5. The rotor blade of claim 1, wherein the rotor blade is a main rotor blade of a helicopter.

6. A helicopter having a rotor system with a plurality of rotor blades, each rotor blade comprising:
   a root region extending from a rotor head to about 15% to 20% of a blade radius;
   a main region extending from a radial extent of the root region to about 80% to 95% of the blade radius; and
   a tip region extending from a radial extent of the main region to a blade tip, at least a portion of one of the root region, the main region and the tip region including an airfoil profile section defined by a scaled set of coordinates in which a set of x/c coordinates defined as a ratio of an x coordinate to a blade chord length, and y/c coordinates defined as a ratio of a y coordinate to the blade chord length, listed in Table I are scaled by a selected factor.

7. The helicopter of claim 6, wherein the tip section is defined by an outboard 20% of the rotor blade span.

8. The helicopter of claim 7, wherein the airfoil profile section is disposed at least partially at the outermost 5% to 7% of the rotor blade span.

9. The helicopter of claim 6, wherein the airfoil profile section is at least partially disposed at the root region.

10. The helicopter of claim 6, wherein the rotor blade is a main rotor blade of the helicopter.

* * * * *